(12) United States Patent  
Suzawa et al.

(10) Patent No.: US 12,447,927 B2
(45) Date of Patent: Oct. 21, 2025

(54) VEHICLE KEY SYSTEM AND ACCESS KEY

(71) Applicant: SUBARU CORPORATION, Tokyo (JP)

(72) Inventors: Shouta Suzawa, Tokyo (JP); Kazuki Tomimatsu, Tokyo (JP); Masato Sato, Tokyo (JP); Masahiro Saito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 72 days.

(21) Appl. No.: 18/527,575

(22) Filed: Dec. 4, 2023

(65) Prior Publication Data
US 2024/0198962 A1 Jun. 20, 2024

(30) Foreign Application Priority Data

Dec. 16, 2022 (JP) ................. 2022-201156

(51) Int. Cl.
B60R 25/25 (2013.01)
B60R 25/04 (2013.01)
B60R 25/24 (2013.01)

(52) U.S. Cl.
CPC ............ B60R 25/252 (2013.01); B60R 25/04 (2013.01); B60R 25/24 (2013.01)

(58) Field of Classification Search
CPC ........ B60R 25/252; B60R 25/04; B60R 25/24
See application file for complete search history.

(56) References Cited

U.S. PATENT DOCUMENTS

| | | | | |
|---|---|---|---|---|
| 9,978,264 B2* | 5/2018 | Ferrin | ................... | G08C 17/02 |
| 9,988,016 B1* | 6/2018 | Bianchi, III | .......... | H04W 12/06 |
| 10,343,650 B1* | 7/2019 | Ahmad | ............. | G07C 9/00571 |
| 10,377,343 B2* | 8/2019 | Krishnan | ........... | G07C 9/00817 |
| 2015/0120151 A1* | 4/2015 | Akay | ..................... | B60R 25/01 |
| | | | | 701/1 |
| 2017/0247016 A1* | 8/2017 | Krishnan | ........... | G07C 9/00817 |
| 2019/0124477 A1* | 4/2019 | Shipley | .................. | H04L 67/12 |
| 2020/0327752 A1* | 10/2020 | Okada | .................. | B60R 25/245 |
| 2021/0144008 A1* | 5/2021 | Prager | ................ | G06V 40/1382 |

FOREIGN PATENT DOCUMENTS

JP 2017-141610 A 8/2017

* cited by examiner

Primary Examiner — Thomas D Alunkal
(74) Attorney, Agent, or Firm — TROUTMAN PEPPER LOCKE LLP

(57) ABSTRACT

A vehicle key system includes an access key, a portable terminal device, and a vehicle. The access key sends an accessible signal via wireless communication. The portable terminal device is switched between a lock mode and an unlock mode. The vehicle unlocks a door of the vehicle or perform a start-up of the vehicle or both when receiving the accessible signal. The portable terminal device includes an authenticator and a terminal wireless communicator. The authenticator authenticates a user input and switches the portable terminal device from the lock mode to the unlock mode. The terminal wireless communicator sends an unlock mode signal regarding the portable terminal device to the access key via the wireless communication. The access key includes a key wireless communicator that sends and receives a signal via the wireless communication. The key wireless communicator sends the accessible signal when receiving the unlock mode signal.

10 Claims, 6 Drawing Sheets

VEHICLE KEY SYSTEM AND ACCESS KEY

CROSS-REFERENCE TO RELATED APPLICATION

The present application claims priority from Japanese Patent Application No. 2022-201156 filed on Dec. 16, 2022, the entire contents of which are hereby incorporated by reference.

BACKGROUND

The disclosure relates to a vehicle key system and an access key.

A vehicle key system including an access key, which is also called a smart key, has been widely used, as described in Japanese Unexamined Patent Application Publication No. 2017-141610, for example. According to the system, the access key is held by a user and performs authentication by establishing wireless communication with a vehicle apparatus. This enables vehicle door lock control and a vehicle start-up without using a mechanical key. The system is called "key-less access and push start", for example. When the user touches a doorknob in a state where an electric wave from the access key reaches the vehicle apparatus, the door is unlocked. When the user pushes a vehicle start-up button in a state where an electric wave from the access key reaches the vehicle apparatus, the vehicle is started up and becomes ready to travel.

SUMMARY

An aspect of the disclosure provides a vehicle key system including an access key, a portable terminal device, and a vehicle. The access key is configured to send an accessible signal via wireless communication. The portable terminal device is configured to be switched between a lock mode and an unlock mode. The vehicle is configured to unlock a door of the vehicle or perform a start-up of the vehicle or both when receiving the accessible signal. The portable terminal device includes an authenticator and a terminal wireless communicator. The authenticator is configured to authenticate a user input and switch the portable terminal device from the lock mode to the unlock mode. The terminal wireless communicator is configured to send an unlock mode signal indicating the unlock mode of the portable terminal device to the access key via the wireless communication. The access key includes a key wireless communicator configured to send and receive a signal via the wireless communication. The key wireless communicator is configured to send the accessible signal when receiving the unlock mode signal.

An aspect of the disclosure provides an access key for a vehicle key system. The access key includes a key control processor and a key wireless communicator. The key control processor is configured to, when the key wireless communicator receives an unlock mode signal indicating an unlock mode of a portable terminal device, cause the key wireless communicator to send an accessible signal adapted to cause a vehicle to unlock a door of the vehicle or perform a start-up of the vehicle or both.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

DETAILED DESCRIPTION

Figure 1:
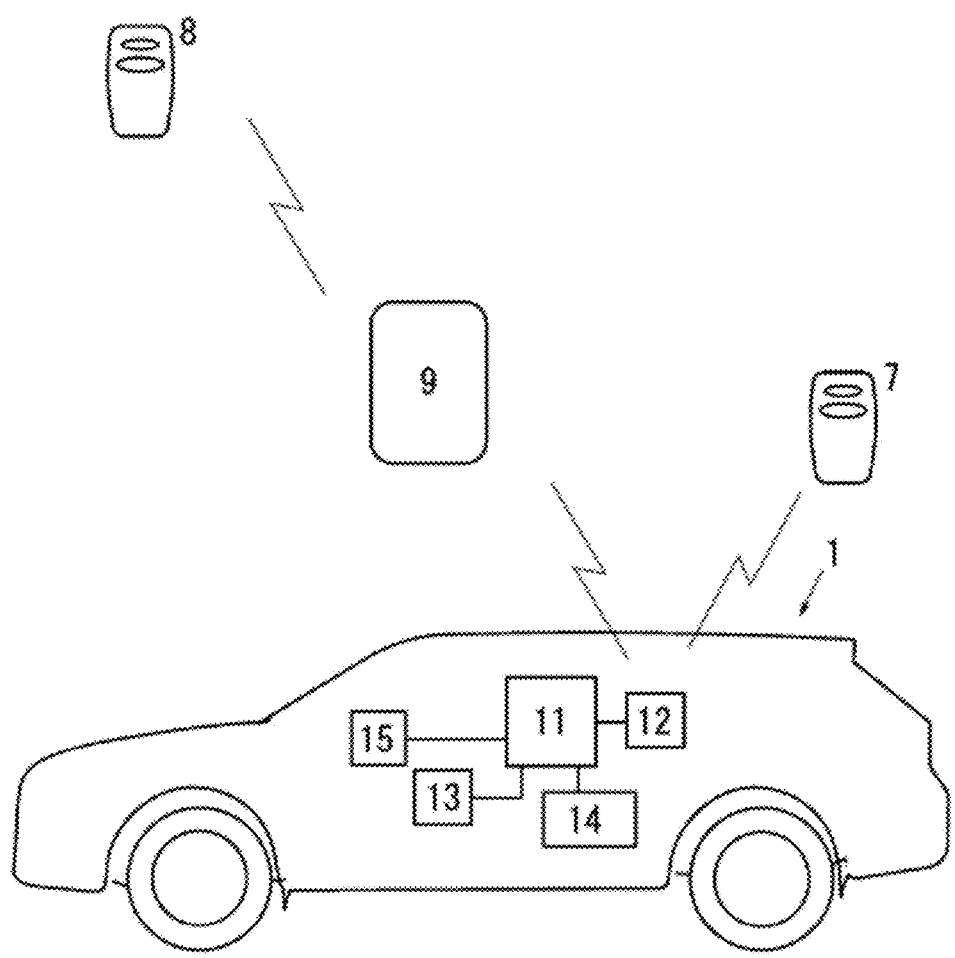
FIG. 1 is a diagram illustrating security cancellation according to an existing vehicle key system.

A relay attack is known as a method of stealing a vehicle by manipulating an electric wave transmitted from an access key to a vehicle key system. In the relay attack, the electric wave transmitted between the vehicle and the access key is received and amplified by a theft relay. The amplified electric wave is outputted from the theft relay to unlock a door of the vehicle even though the access key is not present near the vehicle door. The vehicle is thereby stolen.

One possible anti-theft measure is to put the access key in a metal storage box to block the electric wave from the access key. Another possible anti-theft measure is to add an electric wave stop mode to the access key so that the user is able to stop the electric wave outputted from the access key when leaving away from the vehicle. Stopping the electric wave from the access key blocks authentication using the theft relay and thus prevents the vehicle door from being unlocked by the theft relay, for example. As described above, switching the access key to the electric wave stop mode by operating a button or the like of the access key makes it possible to block the relay attack. However, the anti-theft measure is not effective if the user forgets to switch the access key to the electric wave stop mode. To address the concern, a system that automatically stops the electric wave from the access key has been also devised. According to the system, the access key is provided with a motion sensor. When no vibration of the access key is detected, the access key is automatically switched to the electric wave stop mode. When a vibration of the access key is detected, the electric wave stop mode of the access key is automatically cancelled.

However, the system based on a vibration of the access key generates the necessity to add the motion sensor to the access key, which increases costs. In addition, the electric wave stop mode can be automatically cancelled even when a vibration of the access key is unintentionally caused by an earthquake, for example. Further, when the user holds the access key and leaves away from the vehicle on foot, the access key is not switched to the electric wave stop mode due to a vibration of the access key caused by walking. In this situation, a person holding a theft relay and tailing the user can steal the vehicle using the relay attack.

It is desirable to provide a vehicle key system and an access key that are user-friendly and effectively prevent a vehicle from being stolen by a relay attack.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Prior to describing some example embodiments of the disclosure, a description is given of a method of cancelling security using an existing vehicle key system. FIG. 1 illustrates security cancellation according to the existing vehicle key system.

The vehicle 1 includes an electronic control unit (ECU) assembly 11, a vehicle wireless communicator 12, a doorknob switch 13, a door lock device 14, and a vehicle start-up switch 15, for example. The ECU assembly 11 includes multiple ECUs provided in the vehicle 1. Each of the ECUs in the ECU assembly 11 includes a central processing unit (CPU) and a memory. The multiple ECUs in the ECU assembly 11 includes an engine control unit and a steering control unit that operate in cooperation with each other via communication in accordance with a communication standard of, for example, a controller area network (CAN) to control the vehicle 1. The control of the vehicle 1 is performed by one or more of the ECUs in the ECU 11. The vehicle key system illustrated in FIG. 1 according to the existing vehicle key system further includes an access key 7. When a non-illustrated button of the access key 7 is operated, a door of the vehicle 1 is locked or unlocked.

The vehicle wireless communicator 12 establishes communication with the access key 7 under the control by the ECU assembly 11. The vehicle wireless communicator 12 performs authentication by sending a wireless signal in a low frequency (LF) band to the access key 7 and receiving a wireless signal in an ultra-high frequency (UHF) band from the access key 7. When the authentication is successfully completed, the vehicle 1 is switched to a security disabled mode. When the doorknob switch 13 is turned on while the vehicle 1 is in the security disabled mode, the ECU assembly 11 causes the door lock device 14 to unlock the door. In addition, when the vehicle start-up switch 15 is turned on while the vehicle 1 is in the security disabled mode, the vehicle 1 is started up and becomes ready to travel under the control by the ECU assembly 11.

When entering a predetermined range in which the access key 7 is able to receive a wireless signal from the vehicle 1, the access key 7 exchanges information including authentication information with the ECU assembly 11 of the vehicle 1 via wireless communication established by the vehicle wireless communicator 12 of the vehicle 1. The vehicle wireless communicator 12 sends a wireless signal in the LF band to the access key 7 and receives a wireless signal in the UHF band from the access key 7. Based on the authentication information received from the access key 7 via the wireless communication, the ECU assembly 11 performs an authentication process adapted to determine whether the access key 7 is to be associated as a communication counterpart of the vehicle 1 with the vehicle 1.

When the authentication is successfully completed while the vehicle 1 is in a security enabled mode, the security enabled mode is cancelled and switched to the security disabled mode, and the door of the vehicle 1 becomes able to be unlocked. When the user touches the doorknob switch 13 while the vehicle 1 is in the security disabled mode, the door lock device 14 is activated to unlock the door of the vehicle 1 under the control by the ECU assembly 11. Further, the vehicle 1 becomes able to be started up in the security disabled mode. When the user operates the vehicle start-up switch 15 while the vehicle 1 is in the security disabled mode, the vehicle 1 is started up and ready to travel under the control by the ECU assembly 11.

To steal the vehicle 1 by the method called the relay attack, a theft relay 9 is used to relay wireless communication between the vehicle 1 and an access key 8. As illustrated in FIG. 1, a thief uses the theft relay 9 to establish the wireless communication between the vehicle 1 and the access key 8 that is located remote from the vehicle 1, and to switch the vehicle 1 to the security disabled mode. Thereafter, the thief unlocks the door of the vehicle 1, starts up the vehicle 1, and runs away by driving the vehicle 1 to steal the vehicle 1.

In the relay attack, as illustrated in FIG. 1, the theft relay 9 relays the wireless communication between the vehicle 1 and the access key 8 located remote from the vehicle 1. The theft relay 9 amplifies and relays a wireless signal in the LF band received from the vehicle 1 and a wireless signal in the UHF band received from the access key 8. In some cases, a plurality of theft relays 9 are used; however, a single theft relay 9 is used in the example described herein.

Figure 2:
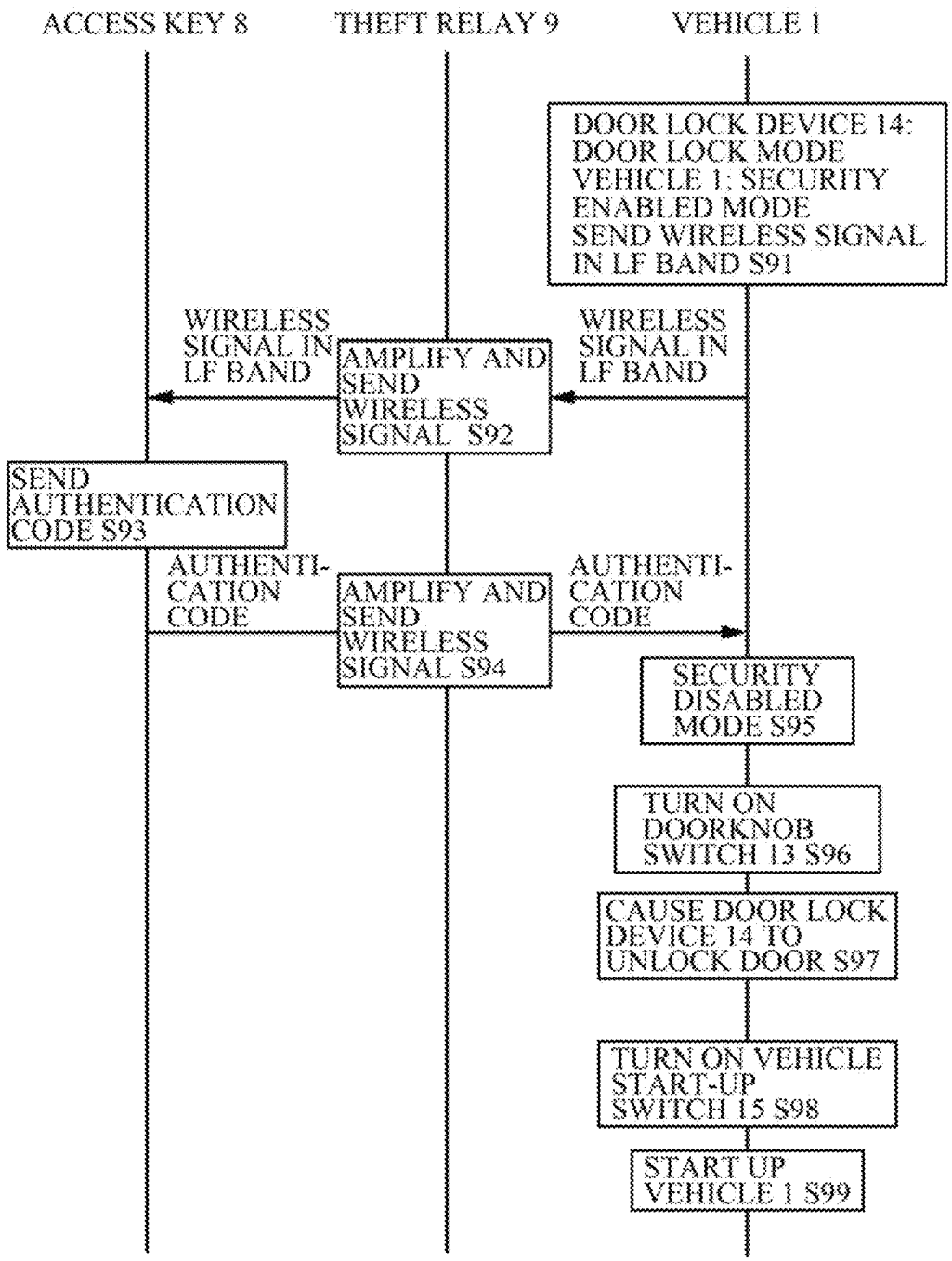
FIG. 2 is a flowchart of a procedure adapted to steal a vehicle by a relay attack.

A flow of the relay attack will now be described with reference to FIG. 2. The flowchart illustrated in FIG. 2 starts with Step S91 in which the door lock device 14 of the vehicle 1 is in a door lock mode, and the vehicle 1 is in the security enabled mode. While the vehicle 1 is in the security enabled mode, the door of the vehicle 1 is not unlocked by the door lock device 14 even when the doorknob switch 13 is turned on, and the vehicle 1 is not started up even when the vehicle start-up switch 15 is turned on. In the security enabled mode, the vehicle 1 sends a wireless signal in the LF band intermittently.

The theft relay 9 amplifies and sends the wireless signal received from the vehicle 1 (Step S92). The wireless signal in the LF band received from the vehicle 1 is thereby sent to the access key 8 located remote from the vehicle 1. When receiving the wireless signal in the LF band, the access key 8 sends an authentication code together with a wireless signal in the UHF band (Step S93).

The theft relay 9 amplifies and sends the wireless signal in the UHF band received from the access key 8 (Step S94). The authentication code sent from the access key 8 is thereby sent to the vehicle 1 located remote from the access key 8. The vehicle 1 having been authenticated with the authentication code is switched to the security disabled mode (Step S95). Accordingly, the theft relay 9 serves as a relay that relays the wireless signal in the LF band and the wireless signal in the UHF band that are used in the vehicle key system.

When the thief turns on the doorknob switch 13 while the vehicle 1 is in the security disabled mode (Step S96), the door lock device 14 unlocks the door of the vehicle 1 (Step S97). When the thief gets into the vehicle 1 and turns on the vehicle start-up switch 15 (Step S98), the vehicle 1 is started up (Step S99). Thereafter, the thief runs away by driving the vehicle 1 to steal the vehicle 1.

Figure 3:
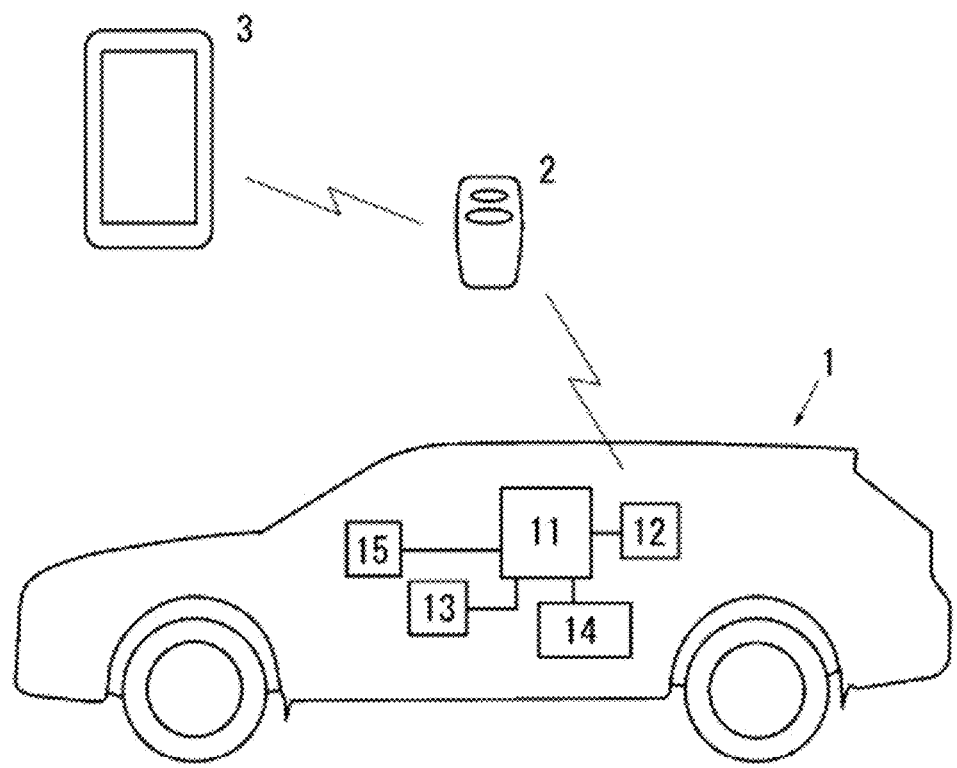
FIG. 3 is a diagram illustrating an exemplary configuration of a vehicle key system according to one example embodiment of the disclosure.

Now, a vehicle key system according to an example embodiment of the disclosure will be described with reference to FIG. 3. FIG. 3 illustrates an exemplary configuration of the vehicle key system according to the example embodiment. The vehicle key system according to the example embodiment includes the vehicle 1, an access key 2, and a portable terminal device 3. The access key 2 and the portable terminal device 3 may be held by a user and used to unlock a door of the vehicle 1 and start up the vehicle 1. The vehicle 1 may have substantially the same configuration as that in the existing vehicle key system, which is described above with reference to FIG. 1, for example.

Figure 4:
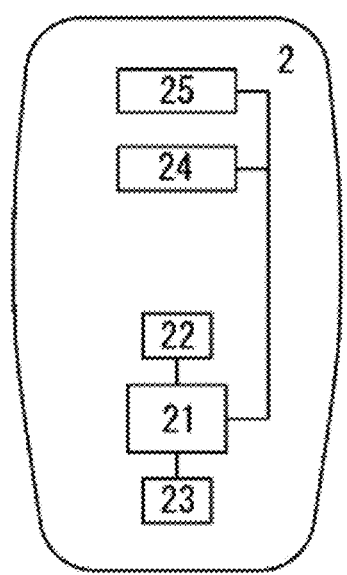
FIG. 4 is a block diagram of an access key of the vehicle key system according to one example embodiment of the disclosure.

The access key 2 illustrated in FIG. 3 may perform authentication by establishing wireless communication in the LF band and the UHF band between the access key 2 and the vehicle 1. FIG. 4 is a block diagram of the access key 2. The access key 2 may include a key control processor 21 that includes a CPU, a key memory 22 that is a storage device, and a key wireless communicator 23 that sends and receives wireless signals. The key wireless communicator 23 may receive a wireless signal in the LF band from the vehicle wireless communicator 12 of the vehicle 1 and may send an authentication code together with a wireless signal in the UHF band under the control by the key control processor 21.

The access key 2 may include a lock button 24 and an unlock button 25. When the user pushes the lock button 24, the door lock device 14 of the vehicle 1 may lock the door of the vehicle 1 via the wireless communication. When the user pushes the unlock button 25, the door lock device 14 may unlock the door of the vehicle 1 via the wireless communication. These operations may be substantially the same as those in the case of the access keys 7 and 8 described above. However, unlike the access keys 7 and 8, the access key 2 according to the example embodiment may have the key wireless communicator 23 to establish wireless communication with the portable terminal device 3.

The portable terminal device 3 illustrated in FIG. 3 may be a smartphone held by the user. The portable terminal device 3 may be configured to establish wireless communication with the access key 2 via Bluetooth (registered trademark owned by the Bluetooth Special Interest Group). Alternatively, the portable terminal device 3 may be a cellular phone, a tablet device, a laptop personal computer, a portable gaming device, or another information processor, for example.

Figure 5:
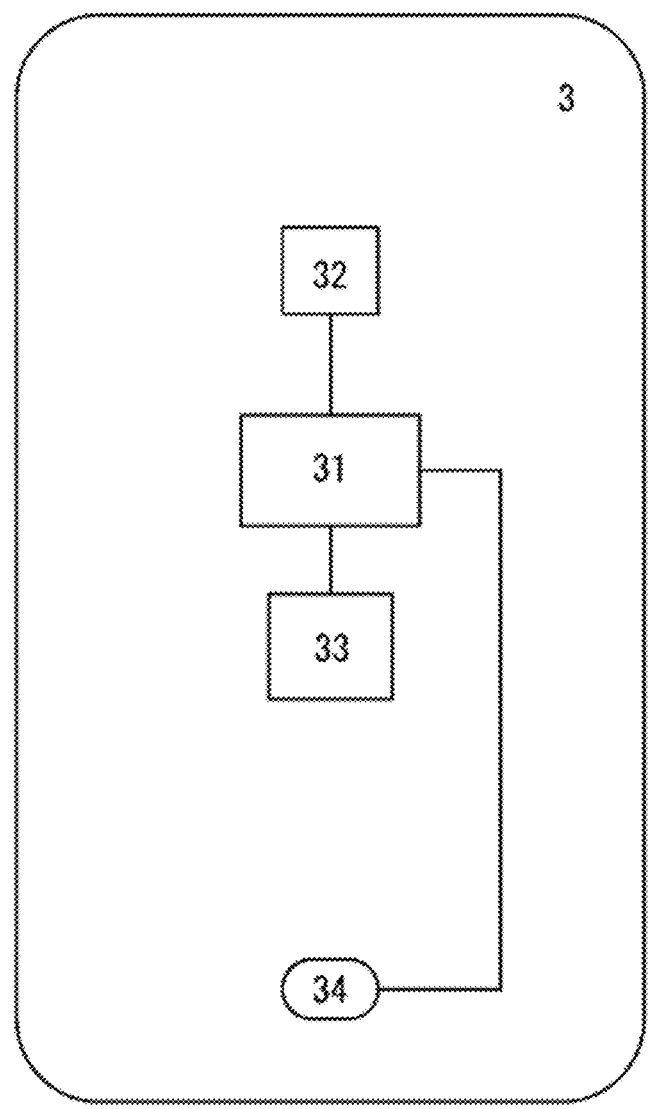
FIG. 5 is a block diagram of a portable terminal device of the vehicle key system according to one example embodiment of the disclosure.

FIG. 5 is a block diagram of the portable terminal device 3. The portable terminal device 3 according to the example embodiment may include a terminal control processor 31 that include a CPU, a terminal memory 32 that is a storage device, a terminal wireless communicator 33, and a fingerprint input device 34. The terminal memory 32 may store an application program adapted to achieve a process to be performed via the wireless communication with the access key 2. The portable terminal device 3 may further include a non-illustrated display and a non-illustrated input unit.

Figure 6:
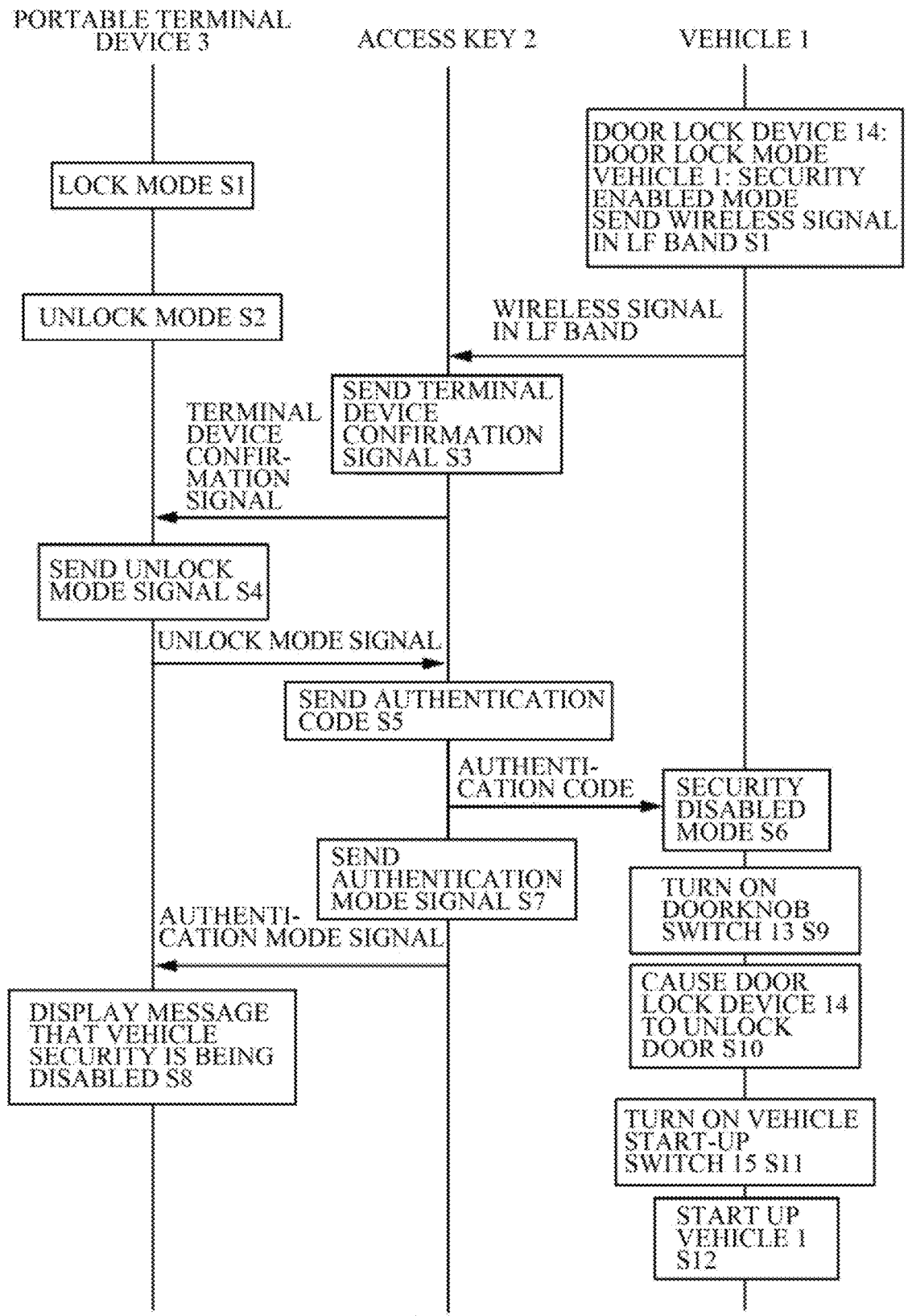
FIG. 6 is a flowchart of a procedure adapted to start up the vehicle in response to a user operation on the vehicle key system according to one example embodiment of the disclosure.

An exemplary flow of a procedure to be performed by a user to start up the vehicle 1 using the vehicle key system according to the example embodiment will now be described with reference to FIG. 6. The flowchart illustrated in FIG. 6 may start with Step S1 in which the door lock device 14 of the vehicle 1 is in the door lock mode, and the vehicle 1 is in the security enabled mode. While the vehicle 1 is in the security enabled mode, the door of the vehicle 1 may not be unlocked by the door lock device 14 even when the doorknob switch 13 is turned on, and the vehicle 1 may not be started up even when the vehicle start-up switch 15 is turned on. In the security enabled mode, the vehicle 1 may send a wireless signal in the LF band intermittently. In addition, in an initial state at Step S1, the portable terminal device 3 may be in a lock mode in which neither image display nor an input operation is available (i.e., the portable terminal device 3 is in an unavailable state).

When the user touches the fingerprint input device 34 of the portable terminal device 3, the terminal control processor 31 may match the inputted fingerprint of the user with fingerprint data stored in the terminal memory 32. If the inputted fingerprint matches with the fingerprint data, the mode of the portable terminal device 3 may be switched to an unlock mode (Step S2). In the unlock mode, image display and an input operation on the portable terminal device 3 may be available (i.e., the portable terminal device 3 is in an available state). Accordingly, the terminal control processor 31 and the terminal memory 32 may also serve as an authenticator that switches the portable terminal device 3 between the available state (i.e., the unlock mode) and the unavailable state (i.e., the lock mode) depending on the result of the authentication of the user input.

When the access key 2 comes closer to the vehicle 1 and receives the wireless signal in the LF band from the vehicle 1, the access key 2 may send a terminal device confirmation signal via the wireless communication using Bluetooth (Step S3). When receiving the terminal device confirmation signal, the portable terminal device 3 may send an unlock mode signal via the wireless communication using Bluetooth because the portable terminal device 3 is in the unlock mode (Step S4). The wireless communication between the access key 2 and the portable terminal device 3 may be established by Bluetooth.

When receiving the unlock mode signal, the access key 2 may send an authentication code in the UHF band (Step S5). When the authentication code is received and authenticated by the vehicle 1, the vehicle 1 may be switched to the security disabled mode (Step S6). If the vehicle 1 moves away from the access key 2 and thus becomes no longer able to receive the authentication code, the vehicle 1 may return to the security enabled mode. Further, when the access key 2 becomes no longer able to receive the unlock mode signal, the access key 2 may stop sending the authentication code, and the vehicle 1 may return to the security enabled mode. The authentication code may be an accessible signal adapted to unlock the door of the vehicle 1 or start up the vehicle 1.

While sending the authentication code, the access key 2 may send an authentication mode signal to the portable terminal device 3 via Bluetooth (Step S7). When receiving the authentication mode signal, the portable terminal device 3 may display a message that the authentication is being performed (Step S8).

When the doorknob switch 13 is turned on while the vehicle 1 is in the security disabled mode (Step S9), the door lock device 14 may unlock the door of the vehicle 1 (Step S10), allowing the user to open the door of the vehicle 1. Further, when the vehicle start-up switch 15 is turned on while the vehicle 1 is in the security disabled mode (Step S11), the vehicle 1 may be started up (Step S12) and ready to travel. In the flowchart illustrated in FIG. 6, the authentication code, which is the accessible signal adapted to unlock the door of the vehicle 1 or start up the vehicle 1, may be sent to the vehicle 1. In the security disabled mode, the door of the vehicle 1 may be able to be unlocked and the vehicle 1 may be able to be started up.

Figure 7:
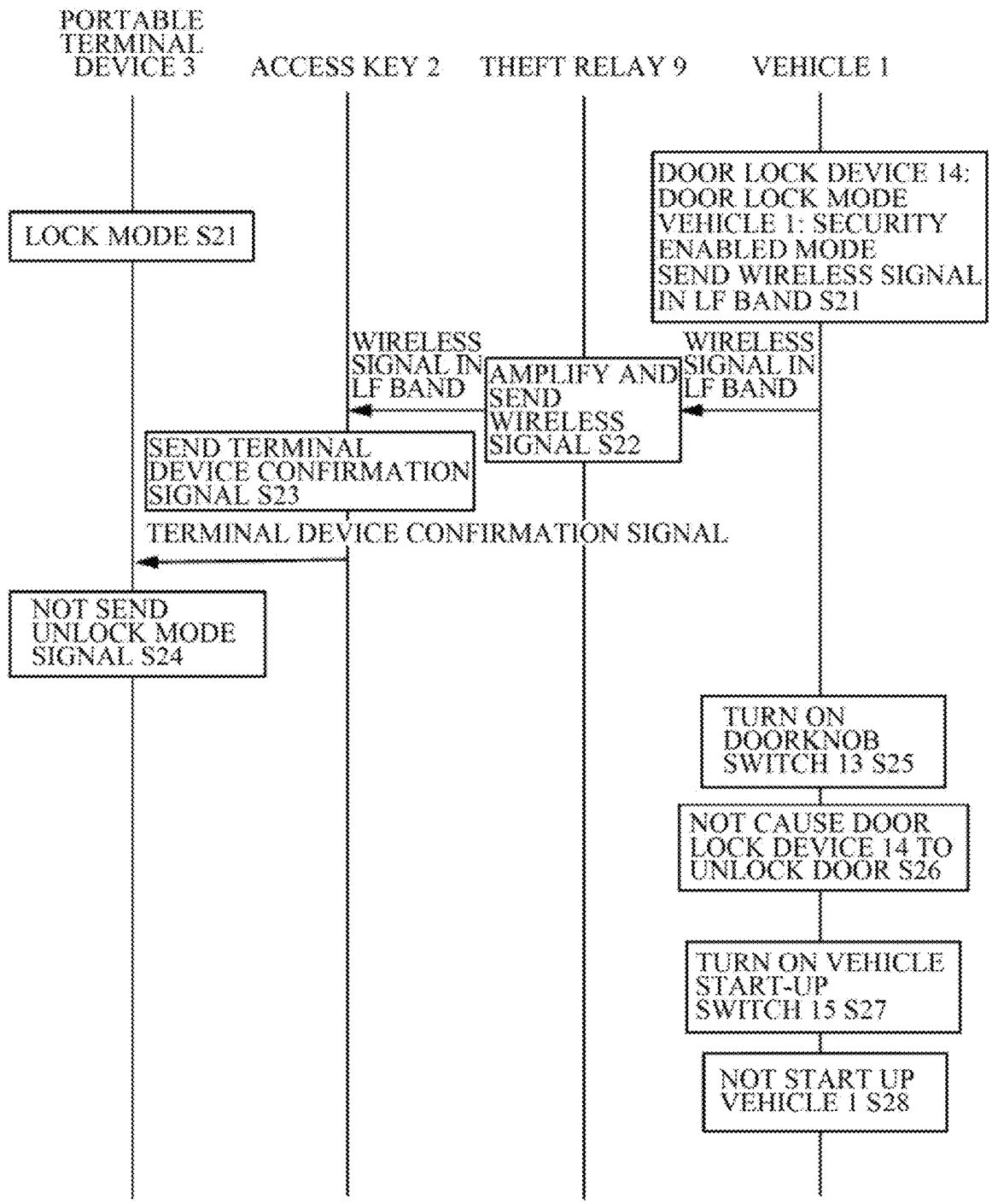
FIG. 7 is a flowchart of a procedure for adapted to block the relay attack by the vehicle key system according to one example embodiment of the disclosure.

Next, an exemplary flow of a procedure adapted to block the relay attack by the vehicle key system according to the example embodiment is described with reference to FIG. 7. The flowchart illustrated in FIG. 7 may start with Step S21 in which the door lock device 14 of the vehicle 1 is in the door lock mode, and the vehicle 1 is in the security enabled mode. In the security enabled mode, the door of the vehicle 1 may not be unlocked by the door lock device 14 even when the doorknob switch 13 is turned on, and the vehicle 1 may not be started up even when the vehicle start-up switch 15 is turned on. In the security enabled mode, the vehicle 1 may send a wireless signal in the LF band intermittently. In addition, in an initial state at Step S21, the portable terminal device 3 may be in the lock mode in which neither image display nor input operation is available.

In this condition, a thief can use the theft relay 9 to steal the vehicle 1. The theft relay 9 can amplify and send the wireless signal in the LF band received from the vehicle 1 (Step S22). The wireless signal in the LF band received from the vehicle 1 may be thereby sent to the access key 2 located remote from the vehicle 1. When receiving the wireless signal in the LF band, the access key 2 may send the terminal device confirmation signal via the wireless communication using Bluetooth (Step S23).

When receiving the terminal device confirmation signal, the portable terminal device 3 may be in the lock mode and thus not send the unlock mode signal (Step S24). Accordingly, the access key 2 may not send the authentication code, and the vehicle 1 may maintain the security enabled mode. In addition, when the communication between the access key 2 and the portable terminal device 3 is not established because the access key 2 and the portable terminal device 3 are remote from each other, the portable terminal device 3 may not send the unlock mode signal. Accordingly, the access key 2 may not send the authentication code, and the vehicle 1 may maintain the security enabled mode.

When the doorknob switch 13 is turned on while the vehicle is in the security enabled mode (Step S25), the door lock device 14 may not unlock the door of the vehicle 1 (Step S26), not allowing the user to open the door of the vehicle 1. Further, when the vehicle start-up switch is turned on while the vehicle 1 is in the security enabled mode (Step S27), the vehicle 1 may not be started up (Step S28) and not ready to travel. In the flowchart illustrated in FIG. 7, the authentication code, which is the accessible signal adapted to unlock the door of the vehicle 1 or start up the vehicle 1, may not be sent to the vehicle 1.

As described above, the vehicle 1 may not be switched to the security disabled mode in a case where the portable terminal device 3 is not in the unlock mode or where the wireless communication between the portable terminal device 3 and the access key 2 is not established because the portable terminal device 3 and the access key 2 are remote from each other. Accordingly, even if the thief sends the wireless signal in the LF band to the access key 2 using the theft relay 9 to perform the relay attack, the access key 2 may not send the authentication code. Thus, the vehicle 1 may maintain the security enabled mode even if the relay attack is performed using the theft relay 9, and may not cause the door lock device 14 to unlock the door of the vehicle 1 even if the thief turns on the doorknob switch 13. Further, since the vehicle 1 maintains the security enabled mode even if the theft relay 9 is used, the vehicle 1 may not be started up even if the thief enters the vehicle 1 by breaking a window of the vehicle 1 or the like and turns on the vehicle start-up switch 15. Therefore, according to the vehicle key system of the example embodiment, it is possible to prevent the vehicle 1 from being stolen.

Even when the access key 2 is located remote from the vehicle 1, the portable terminal device 3 can be connected to the access key 2 and via Bluetooth while the user is using the portable terminal device 3. In this case, the vehicle 1 can be switched to the security disabled mode by the relay attack. Even in such a case, however, the message that the security of the vehicle 1 is being disabled may be displayed on the portable terminal device 3, as indicated in Step S8 in FIG. 6, so that the user is able to recognize the abnormality. When the user switches the portable terminal device 3 to the lock mode, the access key 2 may not send the authentication code, and the vehicle 1 may be switched to the security enabled mode. Optionally, a re-security button to be used to return the vehicle 1 to the security enabled mode may be displayed on the portable terminal device 3 while the message that the security of the vehicle 1 is being disabled is displayed. In this case, the portable terminal device 3 may stop sending the unlock mode signal when an input operation is performed using the re-security button. As a result, the access key 2 may stop sending the authentication code.

According to the example embodiment described above, the vehicle 1 may be switched to the security disabled mode when receiving the authentication code which is the accessible signal. In the security disabled mode, the door of the vehicle 1 may be able to be unlocked, and the vehicle 1 may be able to be started up. Alternatively, in the security disabled mode, only one of the unlocking of the door of the vehicle 1 and the start-up of the vehicle 1 may be able to be performed. Further, as in the case of unlocking the door using the access key 2 according to the example embodiment, the vehicle 1 may be started up in response to a start-up signal generated by pushing the vehicle start-up switch 15 of the access key 2 and sent from the access key 2. Even in this case, it is possible to block the relay attack.

According to the example embodiment described above, the authentication of the portable terminal device 3 may be based on fingerprint authentication. Alternatively, the authentication of the portable terminal device 3 may be based on another type of authentication such as face authentication or password authentication. However, biometric authentication such as fingerprint authentication or face authentication may be more preferable than password authentication because these types of the biometric authentication facilitate quick switching between the lock mode and the unlock mode.

The wireless communication between the portable terminal device 3 and the access key 2 may be established by a communication scheme other than Bluetooth, and the communication between the vehicle 1 and the access key 2 may be established by any type of wireless communication. The disclosure is not limited to the configurations described in the foregoing example embodiment, and various design modifications may be made without departing from the gist of the disclosure.

According to the example embodiments described above, the access key 2 stops outputting the electric wave depending on the mode of the portable terminal device 3. Accordingly, it is possible to effectively prevent the vehicle 1 from being stolen by the relay attack. Further, the access key 2 sends the accessible signal to the portable terminal device 3 when the mode signal indicates that the portable terminal device 3 is in the available state. Accordingly, it is possible to prevent the vehicle 1 from being stolen by the relay attack of the tailing type.

The invention claimed is:

1. A vehicle key system comprising:
an access key comprising a key wireless communicator, the key wireless communicator being configured to communicatively connect to a portable terminal device and a vehicle, wherein
the portable terminal device is configured to be switched between a lock mode and an unlock mode, and
the vehicle is configured to unlock a door of the vehicle or perform a start-up of the vehicle or both when receiving an accessible signal from the key wireless communicator of the access key, wherein
the portable terminal device comprises
an authenticator configured to authenticate a user input and switch the portable terminal device from the lock mode to the unlock mode, and
a terminal wireless communicator configured to send an unlock mode signal indicating the unlock mode of the portable terminal device to the key wireless communicator, wherein
the key wireless communicator is configured to send the accessible signal to the vehicle to cause the vehicle to unlock the door or perform the start-up of the vehicle or both, in response to receiving the unlock mode signal from the terminal wireless communicator.

2. The vehicle key system according to claim 1, wherein the authenticator of the portable terminal device is configured to switch the portable terminal device from the lock mode to the unlock mode based on biometric authentication.

3. An access key for a vehicle key system, the access key comprising:
a key control processor; and
a key wireless communicator configured to communicatively connected to a portable terminal device and a vehicle, wherein
the key control processor is configured to, in response to the key wireless communicator receiving an unlock mode signal indicating an unlock mode of the portable terminal device from the portable terminal device, cause the key wireless communicator to send an accessible signal to the vehicle to cause the vehicle to unlock a door of the vehicle or perform a start-up of the vehicle or both.

4. The vehicle key system according to claim 1, wherein the terminal wireless communicator is configured to send the unlock mode signal when a communication with the access key has been established and the portable terminal device is in the unlock mode.

5. The vehicle key system according to claim 1, wherein the key wireless communicator of the access key is further configured to,
in response to sending the accessible signal to the vehicle, send an authentication mode signal to the terminal wireless communicator of the portable terminal device, to cause a message to be displayed on the portable terminal device, the message notifying an execution of the authentication.

6. The vehicle key system according to claim 5, wherein the terminal wireless communicator is configured to,
receive an input indicating a requirement of returning the vehicle to a security enabled mode, the input being received in response to the display of the message, wherein the vehicle locks the door of the vehicle and does not allow the start-up of the vehicle in the security enabled mode; and
stop sending the unlock mode signal to the key wireless communicator.

7. The vehicle key system according to claim 6, wherein the key wireless communicator of the access key is further configured to,
stop sending the accessible signal to the vehicle when failing to receive the unlock mode signal from the terminal wireless communicator for a predetermined period of time, to cause the vehicle to return to the security enabled mode.

8. The access key according to claim 3, wherein the unlock mode signal is not received when a communication between the access key and the portable terminal device has not been established.

9. The access key according to claim 3, wherein the key wireless communicator is further configured to,
in response to sending the accessible signal to the vehicle, send an authentication mode signal to the portable terminal device, to cause a message to be displayed on the portable terminal device, the message notifying an execution of the authentication.

10. The access key according to claim 9, wherein the key wireless communicator is further configured to,
stop sending the accessible signal to the vehicle when failing to receive the unlock mode signal from the portable terminal device for a predetermined period of time, to cause the vehicle to return to a security enabled mode in which the door of the vehicle is locked and the start-up of the vehicle is not allowed,
wherein the portable terminal device stops sending the unlock mode signal in response to receiving an input indicating a requirement of returning the vehicle to the security enabled mode, the input being made in response to the display of the message.

* * * * *